United States Patent
Riley et al.

(10) Patent No.: US 8,571,191 B2
(45) Date of Patent: Oct. 29, 2013

(54) METHOD AND APPARATUS FOR NEW SUBSCRIBER ACCESS TO TELEPHONY FEATURES

(75) Inventors: John Riley, Topsfield, MA (US); Kevin Ma, North Brunswick, NJ (US); Daniel T. Smires, Freehold, NJ (US)

(73) Assignee: Vonage Network LLC, Holmdel, NJ (US)

(*) Notice: Subject to any disclaimer, the term of this patent is extended or adjusted under 35 U.S.C. 154(b) by 231 days.

(21) Appl. No.: 12/814,070

(22) Filed: Jun. 11, 2010

(65) Prior Publication Data

US 2010/0316202 A1   Dec. 16, 2010

Related U.S. Application Data

(60) Provisional application No. 61/268,324, filed on Jun. 11, 2009.

(51) Int. Cl.
*H04M 11/00* (2006.01)
*H04M 3/42* (2006.01)

(52) U.S. Cl.
USPC .................................. 379/201.05; 379/88.13

(58) Field of Classification Search
USPC ........................................ 379/201.05–201.07
See application file for complete search history.

(56) References Cited

U.S. PATENT DOCUMENTS

| | | | | |
|---|---|---|---|---|
| 5,570,412 A | * | 10/1996 | LeBlanc | 455/456.2 |
| 5,845,227 A | * | 12/1998 | Peterson | 701/209 |
| 6,526,125 B1 | * | 2/2003 | Lindsay et al. | 379/45 |
| 6,553,236 B1 | * | 4/2003 | Dunko et al. | 455/456.1 |
| 6,748,225 B1 | * | 6/2004 | Kepler | 455/456.2 |
| 6,765,998 B2 | * | 7/2004 | Bruce et al. | 379/88.18 |
| 7,133,498 B2 | * | 11/2006 | Cacioppo et al. | 379/45 |
| 2002/0101978 A1 | | 8/2002 | Lo | |
| 2003/0065738 A1 | | 4/2003 | Yang et al. | |
| 2004/0225887 A1 | * | 11/2004 | O'Neil et al. | 713/193 |
| 2005/0113077 A1 | * | 5/2005 | Bushnell et al. | 455/417 |
| 2006/0217111 A1 | * | 9/2006 | Marolia et al. | 455/418 |
| 2006/0270361 A1 | * | 11/2006 | Szymanski et al. | 455/90.2 |
| 2007/0042756 A1 | | 2/2007 | Perfetto et al. | |
| 2008/0097851 A1 | * | 4/2008 | Bemmel et al. | 705/14 |
| 2009/0082004 A1 | * | 3/2009 | Duggal et al. | 455/419 |

FOREIGN PATENT DOCUMENTS

WO   WO-2004/043034 A1   5/2004

OTHER PUBLICATIONS

"SIP: Session Initiation Protocol" J. Rosenberg et al., Network Working Group, Request for Comments: 3261, downloaded from The Internet Engineering Task Force (IETF) website http://www.ietf.org, pp. 1-269.
International Search Report and Written Opinion mailed Dec. 24, 2010 for PCT Application No. PCT/US2010/038378.
Skype: "Skype Available on Apple App Store", Mar. 31, 2009, XP002711355, Retrieved from the Internet: URL:http://about.skype.com/2009/03/skype_available_on_apple_app_s.html.
Supplemental European Search Report for Application No. 10786931.5 dated Aug. 26, 2013, 6 pages.

* cited by examiner

*Primary Examiner* — Joseph T Phan
(74) *Attorney, Agent, or Firm* — Moser Taboada; Joseph Pagnotta

(57) ABSTRACT

A method and apparatus for gaining access to communication services includes receiving an initial inquiry for communication service access, collecting equipment information based upon the initial inquiry, sending a non-voice communication to said equipment and receiving a request from said equipment to obtain communication service access. The apparatus includes a system having one or more controllers for performing communication service access.

13 Claims, 3 Drawing Sheets

METHOD AND APPARATUS FOR NEW SUBSCRIBER ACCESS TO TELEPHONY FEATURES

CROSS-REFERENCE TO RELATED APPLICATIONS

This application claims priority to U.S. Provisional Patent Application Ser. No. 61/268,324 filed Jun. 11, 2009, which is incorporated by reference herein in its entirety.

FIELD OF THE INVENTION

The invention is related to the field of telecommunication devices and services and more specifically, the invention is directed to a method and apparatus for allowing new subscribers of VoIP-based communication services access to VoIP-based communication features.

BACKGROUND OF THE INVENTION

The Public Switched Telephone Network (PSTN) or Plain Old Telephone Service (POTS) was originally developed as a rudimentary "one to one" communication system. That is, it is best suited for connecting a first calling party to a second called party based solely upon the identifying information associated with the called party (i.e., a destination or called telephone number). As the number of PSTN users increased, so did the need for enhanced communication abilities and features such as conference calling, providing communications to multiple users at a single location (i.e., Private Branch Exchange), call waiting, call forwarding and the like. Wireless communications further extended the abilities of the PSTN for enhanced freedom of movement. Smartphone technology (i.e., portable handheld telephony devices) has helped to further advance the ability of the PSTN to provide additional features and services to a subscriber by virtue of their ability to run applications beyond basic telephony (i.e., web browsing, email management, global positioning/mapping/location services and the like)

Voice over IP (VoIP) is a technological development in the field of telecommunications that is utilized to transmit voice conversations over a data network using the Internet Protocol (IP) rather than the dedicated PSTN network. Entities (either businesses or individuals) use VoIP by purchasing and installing a minimal amount equipment (a Customer Premise Equipment (CPE) device) to access a VoIP service provider and subscribing to this telecommunication service. After the VoIP service has been subscribed to and depending on the level of service requested, an entity can make phone calls to other VoIP subscribers or to PSTN customers and access a number of features associated with the VoIP service at a reduced cost than that of the PSTN. However in every instance described above, a party must subscribe to a communication provider to gain access to the features, devices and privileges offered. A party usually finds himself having to subscribe to multiple services and obtain multiple devices to gain access to all possible modes of communication and content that is desired. There has been no advancement in exploiting the benefits of VoIP services by those who have previously only been subscribers of PSTN/mobile services and desire to maintain their current PSTN-based mobile devices (e.g., smartphones).

Therefore, there is need in the art for the ability to access features of one type of communication provider via another without having to obtain a new device and other related ancillary administrative steps.

SUMMARY OF THE INVENTION

Embodiments of the subject invention comprise a method and apparatus for gaining access to communication services. According to some embodiments of the subject invention, the method comprises receiving an initial inquiry for communication service access, collecting equipment information based upon the initial inquiry, sending a non-voice communication to said equipment and receiving a request from said equipment to obtain communication service access.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The subject invention provides access to telephony features for a new subscriber of a communication service (e.g., a VoIP subscriber). For example, subscribers of solely PSTN-based mobile services are able to exploit the benefits of VoIP services and maintain their current PSTN-based mobile devices (e.g., smartphones). The VoIP services are available via a simple communication request (i.e., telephone call) from their existing mobile device. Such communication request generates the necessary inquiries and direction to information that allows the PSTN-based mobile device to receive an application that allows it to perform in (or otherwise have access to) a VoIP-based network. Future communication requests can then be processed via VoIP.

VoIP is a technological development in the field of telecommunications that is utilized to transmit voice conversations over a data network using the Internet Protocol (IP). Entities (either businesses or individuals) use VoIP by purchasing and installing a minimal amount equipment (a Customer Premise Equipment (CPE) device) to access a VoIP service provider and subscribing to this telecommunication service. After the VoIP service has been subscribed to, and depending on the level of service requested, an entity can make phone calls to other VoIP subscribers or to PSTN customers and access a number of features associated with the VoIP service. As part of the call processing is conducted by non-traditional means (i.e. over a packet-based or VoIP network), signaling and call set up is not performed exclusively by the traditional means governed by ISDN and POTS. Signaling that is conducted in the packet-based network(s) is preferably executed using Session Initiation Protocol (SIP). SIP is a popular communication protocol for initiating, managing and terminating media (e.g., voice, data and video) sessions across packet based networks that typically use the Internet Protocol (IP) of which VOIP is an example. As such, there is increased flexibility in the manner in which requests can be executed and increased features for the customer using VoIP. The details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. It uses a location-independent address system feature in which called parties can be reached based on a party's name. SIP supports name mapping and redirection allowing users to initiate and receive communication from any location.

Figure 1:
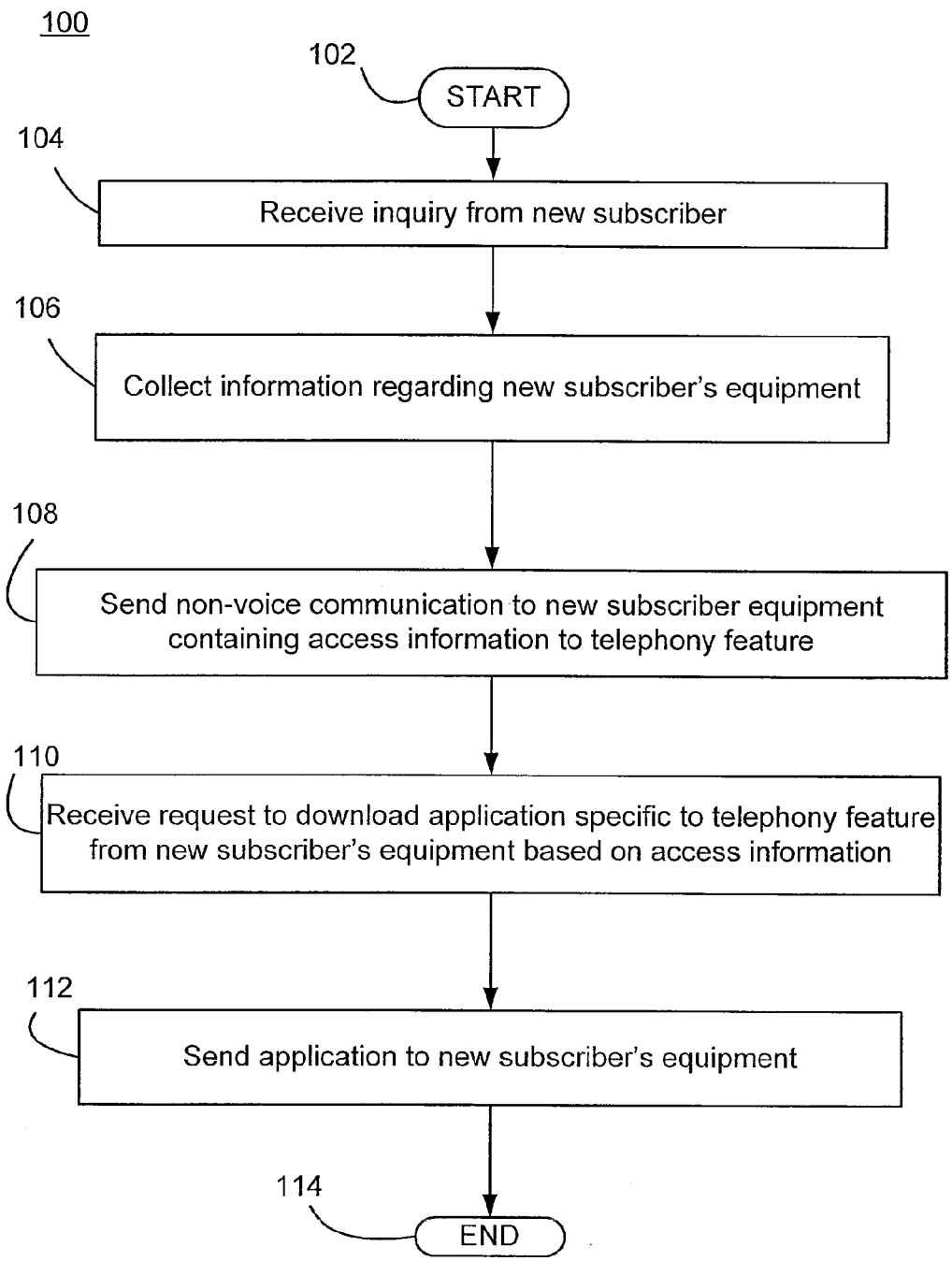
FIG. 1 depicts a series of method steps for allowing new subscribers of VoIP-based communication services access to VoIP-based telephony features in accordance with the subject invention.

FIG. 1 depicts a series of method steps 100 for providing a new subscriber of a communication service (e.g., a VoIP subscriber) access to telephony features associated therewith in accordance with the subject invention. The method 100 begins at step 102 and proceeds to step 104 whereby an inquiry to access a communication service feature is received from a new subscriber of the communication service provider. The inquiry is in one embodiment a telephone call; however, various types of messaging are also capable of being processed in the method 100 described including Short Messaging Service (SMS) or text messages, email, voicemail and the like to provide this initial inquiry.

After the inquiry is received, an information collection is performed at step 106. Specifically, information about the new subscriber's equipment is collected in order to provide a suitable application for downloading and operating on same. In one embodiment of the invention, information is collected via an interactive voice responder (IVR) session. Such IVR session allows the new subscriber to select attributes about their mobile communication device and other parameters necessary to provide the appropriate application. Parameters may be selected from the group consisting of make of subscriber's existing mobile communication device, model of subscriber's existing mobile communication device, desired level of telephony feature (e.g., trial version, base version, enhanced version) and the like. Alternately, the IVR session is replaced with an auto-querying or populating function that detects at least one parameter regarding a subscriber or subscriber's existing device attribute in an attempt to collect the relevant information.

At step 108, a non-voice communication is sent to the subscriber's existing equipment containing information for accessing a telephony feature. In one embodiment of the invention, the non-voice communication is selected from the group consisting of a text (SMS) message, a (MMS) message, an Email, a SIP, a HTTP or other IP-based message. The information can be of any form known to those skilled in the art and in one embodiment is in the form of a hyperlink. With the non-voice communication forming the anchor, the target may be one or more locations where a downloadable software application is stored. For example, one or more such locations may be one or more VoIP system components such as but not limited to servers, memory, database and third party networks or locations that store the application.

At step 110, a request to receive the downloadable application is made. In one embodiment of the invention, the request may be made by having the new subscriber of VoIP services click on the hyperlink in the non-voice communication received in his mobile device. In so doing, the mobile device is able to access the specific webpage from where the telephony feature is downloadable. In an alternate embodiment, the request is initiated upon the opening of the non-voice communication in the mobile device.

At step 112, the downloadable software application is sent to the mobile device of the new subscriber of VoIP services. The download is accomplished by any manner known to those skilled in the art of mobile telephony such as via a wireless network having the appropriate servers and bandwidth capable of transmitting this type of data. The method ends at step 114.

Figure 2:
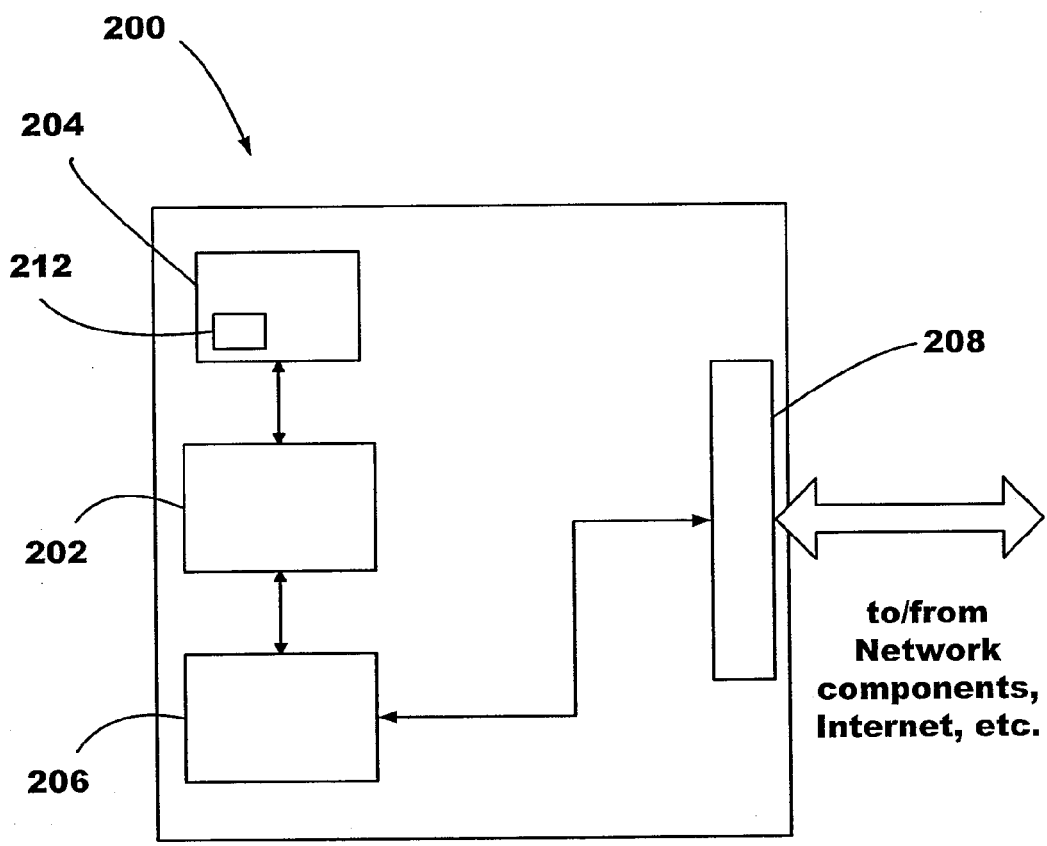
FIG. 2 depicts a schematic diagram of a controller that may be used to practice one or more embodiments of the present invention.

FIG. 2 depicts a schematic diagram of a controller that may be used to practice one or more embodiments of the present invention. Any one, combination or all of the servers identified in FIG. 3 and discussed herein and in greater detail below can function as a controller that may be used to practice the present invention.

The controller 200 may be one of any form of a general purpose computer processor used in accessing an IP-based network such as a LAN/WAN, a corporate intranet, the Internet or the like. The controller 200 comprises a central processing unit (CPU) 202, a memory 204, and support circuits 206 for the CPU 202. The controller 200 also includes provisions 208 for connecting the controller 200 to other network components such as databases and/or secondary storage where copies of the downloadable software applications are stored until subscriber request, customer equipment and the Internet and the one or more input/output devices (not shown) for accessing the controller 200 and/or performing ancillary or administrative functions related thereto. Note that the provisions 208 are shown as a single bus structure in FIG. 2; however, they may alternately be separate bus structures without degrading or otherwise changing the intended operability of the controller 200 or invention in general. Additionally, the controller 200 and its operating components and programming as described in detail below are shown as a single entity; however, the controller may also be one or more controllers and programming modules interspersed around a system each carrying out a specific or dedicated portion of the downloadable software request process. Other configurations of the controller and controller programming are known and understood by those skilled in the art.

The memory 204 is coupled to the CPU 202. The memory 204, or computer-readable medium, may be one or more of readily available memory such as random access memory (RAM), read only memory (ROM), floppy disk, hard disk, flash memory or any other form of digital storage, local or remote. The support circuits 206 are coupled to the CPU 202 for supporting the processor in a conventional manner. These circuits include cache, power supplies, clock circuits, input/output circuitry and subsystems, and the like. A software routine 212, when executed by the CPU 202, causes the controller 200 to perform processes of the present invention and is generally stored in the memory 204. The software routine 212 may also be stored and/or executed by a second CPU (not shown) that is remotely located from the hardware being controlled by the CPU 202.

The software routine 212 is executed when a preferred method of downloadable software request fulfillment is desired. The software routine 212, when executed by the CPU 202, transforms the general purpose computer into a specific purpose computer (controller) 200 that controls the request of, for example, FIG. 1. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 212 of the present invention is capable of being executed on computer operating systems including but not limited to Microsoft Windows 98, Microsoft Windows XP, Apple OS X and Linux. Similarly, the software routine 212 of the present invention is capable of being performed using CPU architectures including but not limited to Apple Power PC, Intel x82, Sun service provider agentRC and Intel ARM.

Figure 3:
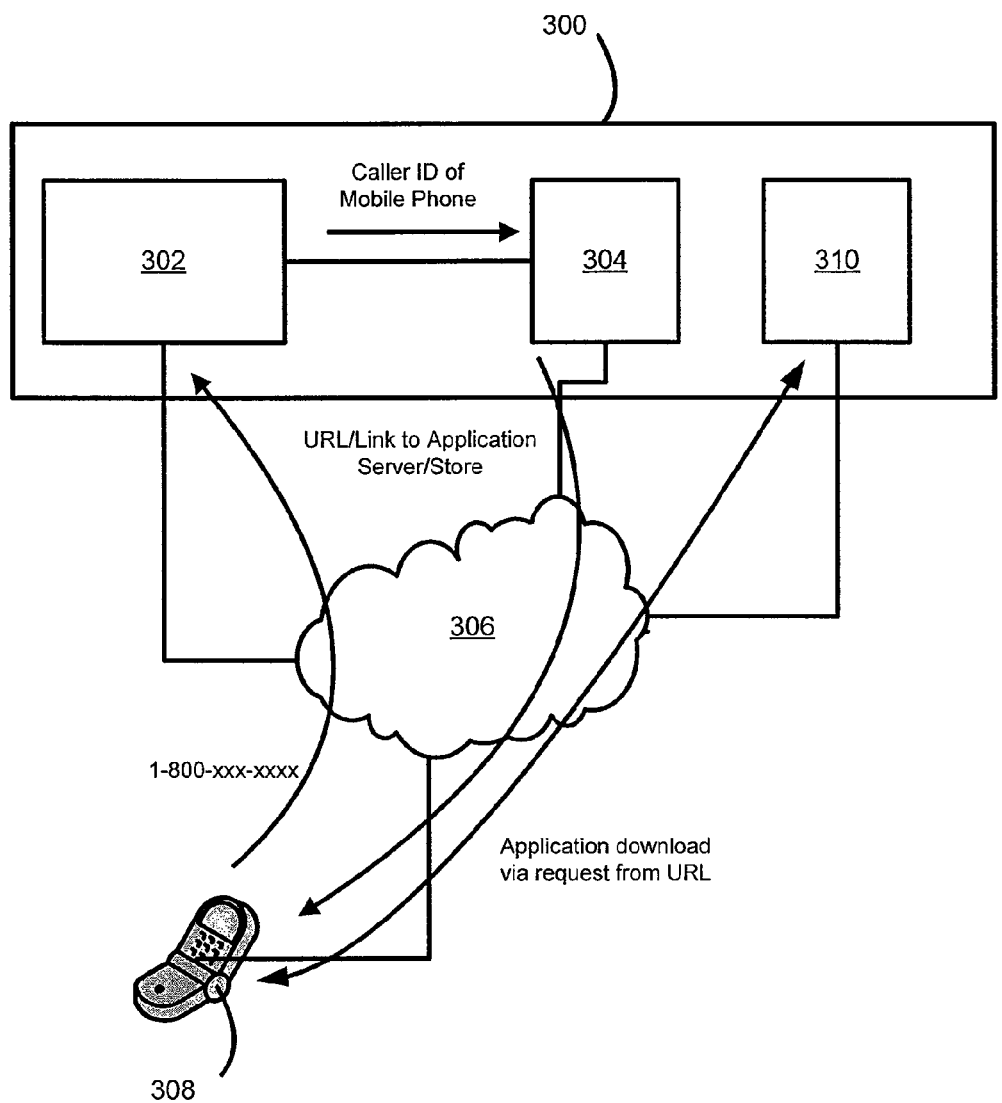
FIG. 3 depicts a system level diagram of network components that interact with each other to allow for new subscriber access of telephony features in accordance with the subject invention.

FIG. 3 depicts a system 300 comprised of network components that interact with each other to provide a new subscriber of a communication service (e.g., a VoIP subscriber) access to telephony features of a VoIP telecommunication environment in accordance with the subject invention. The system 300 comprises a service access terminal 302, an access information message generator 304 and a storage device 310. Each of the indicated network components are connected to a wide area network 306 that provides connection to other networks, devices, services and the like. In one embodiment of the invention, the wide area network is a mobile telephony network although other networks are considered within the scope of the invention including but not limited to the Internet. The wide area network 306 provides a means for connecting a subscriber device 308 to the subscriber's telecommunication service and alternately the system 300 for accessing additional telephony services not otherwise part of the subscriber's current services and features.

The service access terminal 302 provides a portal for new VoIP subscribers to gain access to features associated with the service. For example, when a new VoIP subscriber desires to use the VoIP network instead of the mobile telephony network while using his existing mobile device 308, the service access terminal 302 can be accessed to obtain the necessary tool(s) to have the mobile device 308 perform in the desired manner. In one embodiment of the invention, a service access request is made from the existing mobile device 308. The service access request may be in the form of a toll free telephone number although other telephone numbers or service access request formats are possible such as but not limited to an SMS.

The service access terminal 302 detects the request and determines a recipient for the request. In one embodiment, the recipient is determined by pulling caller ID information from the call made to the service access terminal 302 (i.e., the caller id/DID number of the existing mobile device is obtained). As discussed with reference to the method 100 described above, other information about the subscriber and/or the mobile device 308 is also collected, for example via an IVR process. The recipient and other information is then passed on to the access information message generator 304 which creates a message containing information about how to access the desired feature/telephony service. The message is addressed based on the recipient information. In one embodiment of the invention, the message is a Short Messaging Service (SMS) message and the content of the information is in the form of a Universal Resource Locator (URL) or hyperlink that points to a location where the feature/telephony service may be accessed. Once the addressing and message generation is completed, the message is delivered to the recipient, preferably via the same network 306 that the request was made.

The mobile device 308, having received the message, now has the access information in a format that provides efficient and easy access to the desired feature/telephony service. That is, the mobile device can be activated to access the URL or hyperlink which will direct an action to the storage device 310. The storage device 310 retains the desired application software that, once downloaded, installed and activated on the existing mobile device, will allow the subscriber access to the desired feature/telephony service associated with the VoIP provider. In one embodiment of the invention, the storage device 310 is part of the system 300 associated with the VoIP provider. In an alternate embodiment, the storage device is maintained by a third party provider of telephony/media/communication services and may be associated with or otherwise providing the communication services that are native to the mobile device 308.

While foregoing is directed to embodiments of the present invention, other and further embodiments of the invention may be devised without departing from the basic scope thereof, and the scope thereof.

What is claimed is:

1. A method for providing access to packet-enabled voice communication services comprising:

receiving an initial inquiry for packet-enabled voice communication service access from a mobile device of a user;

collecting equipment information regarding the mobile device responsive to receiving the initial inquiry, wherein the equipment information is collected via an automated feature that detects one or more parameters, without manual user input, pertaining to the mobile device;

sending a non-voice communication to the mobile device where the non-voice communication comprises packet-enabled voice communication connection information generated using the collected equipment information;

receiving a request from the mobile device to provide the packet-enabled voice communication service access, wherein the request is associated with the packet-enabled voice communication connection information sent to the mobile device; and negotiating a packet-enabled voice communication session across a packet based network for the mobile device using the packet-enabled voice communication service access provided to the mobile device responsive to the request.

2. The method of claim 1, wherein the initial inquiry is made via one of a telephone call, a text message, an email or a voicemail.

3. The method of claim 1, wherein the equipment information collected comprises at least one of caller identification information, make of the mobile device, model of the mobile device, or a telephony feature.

4. The method of claim 1, wherein the non-voice communication is one of a text message, a mobile phone message, an email, or an Internet Protocol (IP) based message.

5. The method of claim 1, wherein the non-voice communication comprises a link having a target of at least one location where a downloadable software application is stored.

6. An apparatus for providing access to packet-enabled voice communication services comprising:

a service access terminal for receiving an initial inquiry for packet-enabled voice communication service access from a mobile device of a user and collecting equipment information regarding the mobile device responsive to receiving the initial inquiry, wherein the equipment information is collected via an automated feature that detects one or more parameters, without manual user input, pertaining to the mobile device; and an access information message generator for sending a non-voice communication to the mobile device where the non-voice communication comprises packet enabled voice communication connection information generated using the collected equipment information, receiving a request from the mobile device to provide the packet-enabled voice communication service access, wherein the request is associated with the packet-enabled voice communication connection information sent to the mobile device, and negotiating a packet-enabled voice communication session across a packet based network for the mobile device using the packet-enabled voice communication service access provided to the mobile device responsive to the request.

7. The apparatus of claim 6, wherein the initial inquiry is made via one of a telephone call, a text message, an email or a voicemail.

8. The apparatus of claim 6, wherein the equipment information collected comprises at least one of caller identification information, make of the mobile device, model of the mobile device, or a telephony feature.

9. The apparatus of claim 6, wherein the non-voice communication is one of a text message, a mobile phone message, an email, or an Internet Protocol (IP) based message.

10. The apparatus of claim 6, wherein the non-voice communication comprises a link having a target of at least one location where a downloadable software application is stored.

11. A tangible non-transitory computer readable medium storing a software program that, when executed by a computer, causes the computer to perform a method for gaining access to packet-enabled voice communication services comprising, the method comprising:

receiving an initial inquiry for packet-enabled voice communication service access from a mobile device of a user;

collecting equipment information regarding the mobile device responsive to receiving the initial inquiry, wherein the equipment information is collected via an automated feature that detects one or more parameters, without manual user input, pertaining to the mobile device;

sending a non-voice communication to the mobile device where the non-voice communication comprises packet-enabled voice communication connection information generated using the collected equipment information;

receiving a request from the mobile device to provide the packet-enabled voice communication service access, wherein the request is associated with the packet-enabled voice communication connection information sent to the mobile device; and negotiating a packet-enabled voice communication session across a packet based network for the mobile device using the packet-enabled voice communication service access provided to the mobile device responsive to the request.

12. The computer readable medium of claim 11, wherein the initial inquiry is made via one of a telephone call, a text message, an email or a voicemail; and wherein the equipment information collected comprises at least one of caller identification information, make of the mobile device, model of the mobile device, or a telephony feature.

13. The computer readable medium of claim 11, wherein the non-voice communication comprises a link having a target of at least one location where a downloadable software application is stored; and wherein the non-voice communication is one of a text message, a mobile phone message, an email, or an Internet Protocol (IP) based message.

* * * * *